US009297198B2

(12) United States Patent
Malvey et al.

(10) Patent No.: US 9,297,198 B2
(45) Date of Patent: Mar. 29, 2016

(54) AUTOMATIC FIRE RESISTANT EXTERIOR SHUTTER

(71) Applicant: Mahtomedi Area Education Foundation, Mahtomedi, MN (US)

(72) Inventors: Ryan Nicholas Malvey, Birchwood, MN (US); Samuel Joseph Ruzynski, Grant, MN (US); Samuel Brott Kalkman, Mahtomedi, MN (US); Evin Daniel Sougstad, Mahtomedi, MN (US); Liam Olaf Flanary, Mahtomedi, MN (US); Nicholas Lee Ruzynski, Grant, MN (US); Megan Wolgamot Malvey, Birchwood, MN (US); Mindy Lynn Ruzynski, Grant, MN (US); Steven Frederick Wolgamot, Mahtomedi, MN (US)

( * ) Notice: Subject to any disclaimer, the term of this patent is extended or adjusted under 35 U.S.C. 154(b) by 0 days.

(21) Appl. No.: 14/121,968

(22) Filed: Nov. 7, 2014

(65) Prior Publication Data

US 2015/0167378 A1 Jun. 18, 2015

Related U.S. Application Data

(60) Provisional application No. 61/963,799, filed on Dec. 16, 2013.

(51) Int. Cl.

| | |
|---|---|
| ***E06B 5/16*** | (2006.01) |
| ***B32B 7/08*** | (2006.01) |
| ***B32B 13/10*** | (2006.01) |
| ***B32B 7/12*** | (2006.01) |
| ***E04B 1/94*** | (2006.01) |
| ***E06B 9/02*** | (2006.01) |
| ***E06B 9/04*** | (2006.01) |

(Continued)

(52) U.S. Cl.
CPC . *E06B 5/167* (2013.01); *A62C 2/12* (2013.01); *A62C 2/242* (2013.01); *E06B 9/04* (2013.01)

(58) Field of Classification Search
CPC ............. E06B 5/167; E06B 9/04; B32B 7/08; B32B 13/10; B32B 7/12; B32B 2419/00; B32B 2307/3065; E04B 1/947; E04B 1/942
See application file for complete search history.

(56) References Cited

U.S. PATENT DOCUMENTS

| | | | | | |
|---|---|---|---|---|---|
| 461,857 | A | * | 10/1891 | Tufts | 49/7 |
| 1,243,690 | A | * | 10/1917 | Blauvelt | 169/42 |
| 1,357,162 | A | * | 10/1920 | Giles | 16/257 |

(Continued)

FOREIGN PATENT DOCUMENTS

| | | | |
|---|---|---|---|
| CN | 102070924 | A | 5/2011 |
| CN | 102733732 | A | 10/2012 |

(Continued)

*Primary Examiner* — Rodney Mintz

(57) ABSTRACT

A fire resistant shutter is provided including a first panel including wood and a second panel including a cementitious material located adjacent to the first panel. The fire resistant shutter further includes a hasp attached to the second panel and configured to be attached to a building structure with a detachable connector, and a pin including wax disposed in an aperture defined by the hasp. The pin prevents the hasp from opening. When the fire resistant shutter is attached to a building structure, heat from an approaching fire at least partially melts the pin, which opens the hasp, detaches the connector, and allows the shutter to drop. The deployed shutter provides fire resistance to the building structure, such as at a window.

20 Claims, 4 Drawing Sheets

(51) Int. Cl.
*A62C 2/12* (2006.01)
*A62C 2/24* (2006.01)

(56) References Cited

U.S. PATENT DOCUMENTS

| | | | | |
|---|---|---|---|---|
| 1,953,582 | A * | 4/1934 | Belknap | 169/42 |
| 3,935,681 | A | 2/1976 | Voiturier | |
| 3,968,841 | A * | 7/1976 | Harmathy | 169/48 |
| 4,282,687 | A * | 8/1981 | Teleskivi | 49/503 |
| 5,130,184 | A | 7/1992 | Ellis | |
| 5,404,674 | A * | 4/1995 | Gethers, Jr. | 49/141 |
| 6,599,621 | B2 | 7/2003 | Porter | |
| 6,913,819 | B2 | 7/2005 | Wallner | |
| 7,028,431 | B2 | 4/2006 | Tlemcani | |
| 7,814,705 | B2 | 10/2010 | Reed | |
| 8,397,864 | B2 | 3/2013 | Tinianov | |
| 8,656,683 | B2 * | 2/2014 | Hedditch et al. | 52/784.11 |
| 8,844,195 | B2 * | 9/2014 | Cox et al. | 49/7 |
| 2008/0001128 | A1 * | 1/2008 | Goldberg | 252/604 |
| 2008/0313981 | A1 * | 12/2008 | Donley et al. | 52/203 |
| 2011/0256372 | A1 * | 10/2011 | Hauber et al. | 428/218 |
| 2011/0308161 | A1 * | 12/2011 | Cox et al. | 49/324 |
| 2013/0160383 | A1 * | 6/2013 | Hedditch et al. | 52/202 |
| 2013/0227891 | A1 | 9/2013 | Cox | |
| 2013/0251986 | A1 * | 9/2013 | Charlton et al. | 428/341 |
| 2014/0223826 | A1 * | 8/2014 | Jensen et al. | 49/404 |

FOREIGN PATENT DOCUMENTS

| | | | |
|---|---|---|---|
| GB | 190203805 | A * | 11/1902 |
| GB | 219727 | A * | 7/1924 |
| WO | WO-96/24489 | A1 | 8/1996 |

* cited by examiner

AUTOMATIC FIRE RESISTANT EXTERIOR SHUTTER

CROSS-REFERENCE TO RELATED APPLICATIONS

This application claims priority to U.S. Application Ser. No. 61/963,799, filed on Dec. 16, 2013, the disclosure of which is incorporated by reference herein in its entirety.

TECHNICAL FIELD

The present disclosure relates to fire resistant shutters, and more particularly to fire resistant shutters for the exterior of a building structure, which are automatically deployed.

BACKGROUND

A persistent issue for residential properties is damage or destruction by fires, such as wildfires. Occasionally residents remain in the vicinity of a fire in an attempt to protect their property and put themselves at risk of injury or death when acting to keep a building structure safe from the fire.

Fires often enter a building structure through weak points, such as glass windows and doors. Often, when glass breaks, embers from the fire enter the building structure through the resulting opening and cause the interior of the building structure to burn. Exterior fire resistant shutters typically require expensive specialty materials and manufacturing. Some example materials employed in fire resistant shutters include asphalt or steel shingles, reinforced composite materials, metal sheets, intumescent coatings, and core/shell design shutters. Active fire suppression systems, such as sprinkler systems, are also commercially available. Consequently, there remains a need for fire resistant shutters that may easily be constructed from inexpensive, readily-available materials.

SUMMARY

The present disclosure provides automatic fire resistant shutters, which have decreased costs of materials and manufacturing, as compared to other fire resistant shutters.

In a first embodiment, the present disclosure provides a fire resistant shutter including a first panel comprising wood; and a second panel comprising a cementitious material, the second panel disposed adjacent to the first panel. The fire resistant shutter further includes a hasp attached to the second panel and configured to be attached to a building structure with a detachable connector; and a pin comprising wax disposed in an aperture defined by the hasp. The pin prevents the hasp from opening.

In a second embodiment, the present disclosure provides a fire resistant shutter including a first panel comprising plywood; and a second panel comprising cement board, the second panel disposed adjacent to the first panel. The fire resistant shutter further includes a hasp attached to the second panel and configured to be attached to a building structure with a detachable wire; and a pin comprising wax disposed in an aperture defined by the hasp. The pin prevents the hasp from opening.

Various unexpected results and advantages are obtained in exemplary embodiments of the disclosure. One such advantage of exemplary embodiments of the present disclosure is the ability to simply produce low cost fire resistant shutters that deploy automatically. Another advantage of exemplary embodiments of the present disclosure is the potential ability to awaken sleeping residents when the automatic fire resistant shutters deploy and audibly strike the building structure. An additional potential advantage of exemplary embodiments of the present disclosure is that the use of automatically deployed fire resistant shutters will encourage residents and property owners to avoid the area impacted by fire. A further potential advantage of exemplary embodiments of the present disclosure is that the absence of metal in the fire resistant shutters decreases heat conduction as compared to fire shutters that incorporate metal materials into their construction.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the cited list serves only as a representative group and should not be interpreted as an exclusive list.

DETAILED DESCRIPTION

Figure 1:
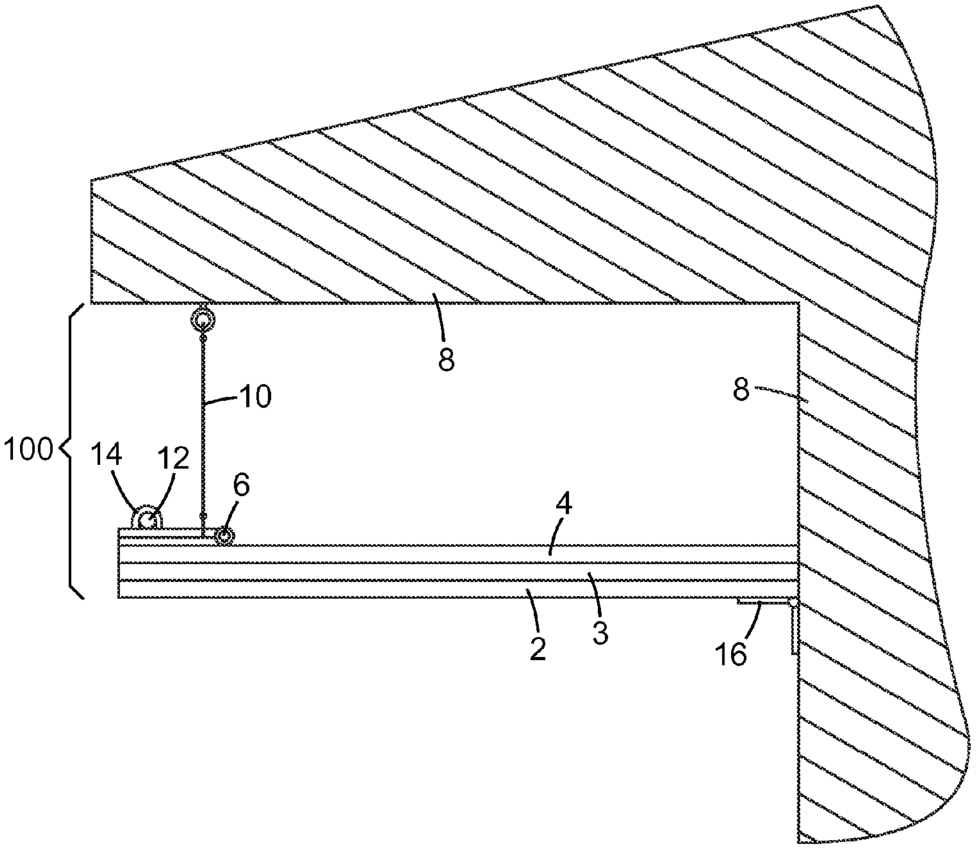
FIG. 1 is a cross-sectional schematic including a fire resistant shutter according to an exemplary embodiment, in a set position.

Automatic fire resistant shutters are provided that are constructed from inexpensive and readily available materials, which provide protection to vulnerable areas of a building structure during contact with fire, preferably protection for at least ten minutes. Typically, a wildfire will pass through an area in approximately ten minutes; hence, it is not usually necessary to provide protection from fire for longer than that. There is a need for more affordable fire resistant shutters that are also simple to manufacture.

For the following Glossary of defined terms, these definitions shall be applied for the entire application, unless a different definition is provided in the claims or elsewhere in the specification.

GLOSSARY

Certain terms are used throughout the description and the claims that, while for the most part are well known, may require some explanation. It should be understood that, as used herein:

As used in this specification and the appended embodiments, the singular forms “a”, “an”, and “the” include plural referents unless the content clearly dictates otherwise. Thus, for example, reference to “a material” includes a mixture of two or more materials.

As used in this specification and the appended embodiments, the term “or” is generally employed in its sense including “and/or” unless the content clearly dictates otherwise. The term “and/or” means either or both. For example, the expression “A and/or B” means A, B, or a combination of A and B.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The term "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "cementitious" refers to a material having a cement base. This further includes a laminate of layers of at least one material having a cement base and one or more layers of other materials, as well as a mixture of a cement base and fillers (e.g., fire retardant materials, strengthening agents, etc.).

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Thus, in a first exemplary embodiment, the disclosure provides a fire resistant shutter including a first panel comprising wood; and a second panel comprising a cementitious material, the second panel disposed adjacent to the first panel. The fire resistant shutter further includes a hasp attached to the second panel and configured to be attached to a building structure with a detachable connector; and a pin comprising wax disposed in an aperture defined by the hasp. The pin prevents the hasp from opening.

In a second exemplary embodiment, the disclosure provides a fire resistant shutter including a first panel comprising plywood; and a second panel comprising cement board, the second panel disposed adjacent to the first panel. The fire resistant shutter further includes a hasp attached to the second panel and configured to be attached to a building structure with a detachable wire; and a pin comprising wax disposed in an aperture defined by the hasp. As in the first exemplary embodiment, the pin prevents the hasp from opening.

The below disclosure relates to both the first exemplary embodiment and the second exemplary embodiment.

Referring to FIG. 1, a cross-sectional schematic is provided including a fire resistant shutter 100 comprising a first panel 2 and a second panel 4, the second panel 4 disposed adjacent to the first panel 2. The fire resistant shutter 100 further comprises a hasp 6 attached to the second panel 4 and configured to be attached to a building structure 8 with a detachable connector 10; and a pin 12 comprising wax disposed in an aperture 14 defined by the hasp 6. The pin 12 prevents the hasp from opening. Typically, the fire resistant shutter 100 can be attached to a roof or soffit portion of a building structure 8, as depicted in FIG. 1. In certain aspects, the fire resistant shutter can be attached to a vertical wall of a building structure with a detachable connector. In most embodiments, the fire resistant shutter 100 further comprises a hinge 16 attached to the first panel 2 (shown) or to the second panel 4 (not shown) to affix the fire resistant shutter to a building structure 8. The hinge 16 both secures the fire resistant shutter to the building structure and also allows the fire resistant shutter 100 to rotatably move between a set position and a deployed position.

The wood material for the first panel is not particularly limited. In certain embodiments, the first panel comprises plywood, chipboard, oriented strandboard, or a combination thereof. The first panel provides structural integrity (e.g., tensile strength) to the fire resistant shutter, thus if the first panel is too thin, the fire resistant shutter will crack or break apart either under its own weight, or during deployment. On the other hand, if the first panel is too thick, there will be a significant gap between the exterior surface of a building structure and edges of the second panel. The larger the gap, the less fire resistance is provided to the exterior surface of the building structure. In many embodiments, the first panel has a thickness of about 0.5 inch (1.27 centimeters). The first panel is also suitable for finishes such as paint and stain, for aesthetically matching or complementing the exterior appearance of a building structure.

The cementitious material of the second panel is not particularly limited. One readily commercially available cementitious material suitable for outdoor use comprises cement board. If the second panel is too thin, insufficient fire resistance will be provided by the shutter and there is an increased risk of cracking or breaking of the second panel, particularly during deployment. If the second panel is too thick, the fire resistant shutter will be unnecessarily heavy; potentially too heavy to allow use of otherwise suitable connectors between the panels and a building structure. In certain embodiments, the second panel has a thickness of about 0.5 inch (1.27 centimeters).

The wax material for the hasp pin is not particularly limited. Waxes typically have melting points at or above 37° C. (99° F.). For example and without limitation, the wax comprises beeswax, carnauba wax, candelilla wax, castor wax, esparto wax, japan wax, ouricury wax, paraffin wax, montan wax, lanolin, tallow tree wax, bayberry wax, rice brain wax, ceresin wax, ozocerite, peat wax, polyethylene wax, or soy wax. The specific wax may be selected for a desired melting point. For instance, a major component of beeswax is myricyl palmitate which has a melting point of 62-65° C. Paraffin wax, in contrast, begins to melt at 37° C. The wax hasp pin is free of any added structural reinforcing material (e.g., metal, wood, cementitious material, etc.). In certain embodiments, the pin comprises a candle, such as a birthday candle. The diameter of the hasp pin can be varied, with a minimum diameter being limited by the smallest diameter that will hold the weight of the fire resistant shutter when the fire resistant shutter is in the set position, and a maximum diameter being limited by the inner diameter of the hasp aperture. Typically, larger diameters will provide pins that are less prone to accidental breakage.

The material for the detachable connector is not particularly limited as long as the connector has sufficient structural integrity to support the majority of the weight of the panels of the fire resistant shutter. In certain aspects, the connector comprises a wire, a rope, a chain, or a combination thereof. An advantage of employing a wire is that typically a metal wire provides high strength combined with a thin diameter, which makes the wire connector less visible to an observer.

The panels of the fire resistant shutter are attached using any known methods. For instance, in certain aspects, the first panel is attached to the second panel with an adhesive, whereas in other aspects the first panel is attached to the second panel with a mechanical fastener. Optionally, both an adhesive and a mechanical fastener are employed to attach the first and second panels together. The adhesive is not particularly limited, and includes for example and without limitation polyurethane adhesives, epoxy adhesives, silicone adhesives, and any other adhesives typically employed with construction materials. Suitable mechanical fasteners are known to the skilled practitioner and comprise for instance a bolt, a screw, a nail, or a combination thereof. Each of the first panel and the second panel is optionally provided as a single sheet, or instead as a plurality of pieces.

In certain embodiments, fire resistant shutters according to the present disclosure further comprise a third panel 3 disposed between the first panel and the second panel. Preferably, the third panel comprises SHEETROCK (e.g., drywall or wallboard) to provide additional fire resistance to the shutter. As SHEETROCK (e.g., drywall or wallboard) is not water resistant, however, it would need to be protected from degradation by moisture. The first and second panels provide protection of the major surfaces of the third panel, and optionally the edges of the third panel are also protected from moisture degradation, such as by covering the edges with additional cementitious material or by sealing with another waterproof material. In embodiments including a third panel, the third panel is attached to each of the first panel and to the second panel with an adhesive, a mechanical fastener, or a combination thereof.

In certain embodiments, the first panel and the second panel have the same width and the same length. Having comparable width and length dimensions is advantageous in that the first panel comprising wood provides structural strength to the major surfaces of the second panel comprising cementitious material and the second panel provides fire resistance to the major surfaces of the first panel. In alternate embodiments, the first panel has a smaller width, a smaller length, or both, than the second panel. An advantage to such embodiments is that the larger cementitious panel helps protect the edges of the first panel (comprising wood) from potentially catching fire. Similarly, cementitious material may be affixed to one or more edges of the first panel to protect the first panel from the heat of a fire.

Figure 2:
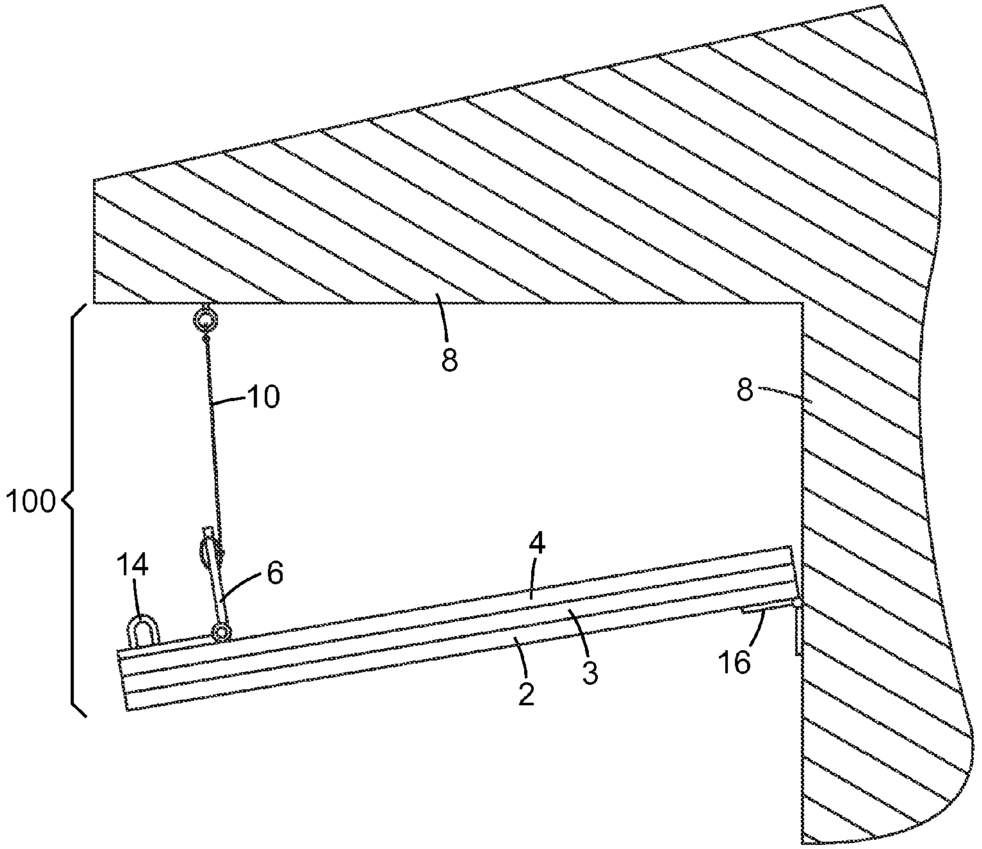
FIG. 2 is a cross-sectional schematic including the fire resistant shutter according to FIG. 1, in operation.

Referring to FIG. 2, in operation, when the pin 12 (not shown) has been exposed to elevated temperature such that pin melts or breaks: the hasp 6 opens, the connector 10 detaches from the hasp 6 (and thus from the fire resistant shutter 100), and the weight of the fire resistant shutter 100 causes the fire resistant shutter 100 to move from the set position (e.g., as illustrated in FIG. 1) towards a deployed position.

Figure 3A:
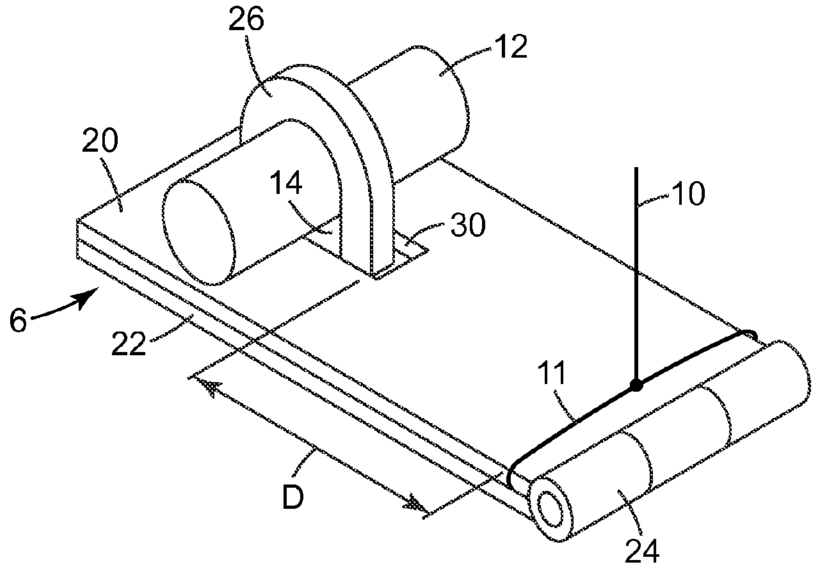
FIG. 3A is a perspective schematic of a closed hasp according to an exemplary embodiment.

Referring to FIG. 3A, a perspective schematic is provided of a secured hasp 6. The hasp 6 includes a first leaf 20 and a second leaf 22 movably attached to the first leaf 20 by a hinge portion 24. The second leaf 22 comprises a loop 26 protruding from a first major surface 27 (see FIG. 3B) of the second leaf 22, the loop 26 defining an aperture 14. The loop 26 is disposed distal from the hinge portion 24. As discussed above with respect to FIG. 1, when the fire shutter 100 is in the set position, a pin 12 is disposed in the aperture 14 to prevent the hasp 6 from opening. The first leaf 20 defines an aperture 30 through which the loop 26 protrudes when the hasp 6 is in a closed (e.g., secured) position. Advantageously, the detachable connector 10 is affixed to the first leaf 20 proximal to the hinge portion 24, at a distance D from the loop 26 so that the connector 10 supports the majority of the weight of the fire resistant shutter 100 and the pin 12 supports a small fraction of the weight of the fire resistant shutter 100. This allows the use of soft material such as wax for the pin 12 because the pin 12 does not have to be sufficiently strong to hold most or all of the weight of the fire resistant shutter 100 without breaking. Preferably, the distance D is at least 90% of the total length of the first leaf 20, or at least 95% of the total length of the first leaf 20.

Figure 3B:
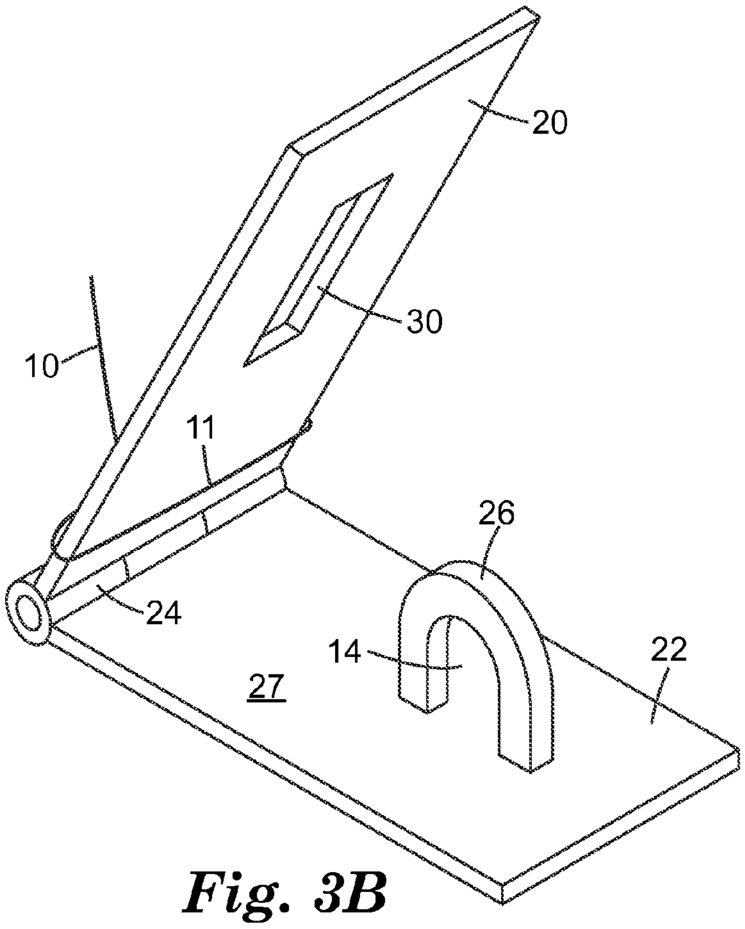
FIG. 3B is a perspective schematic of the hasp of FIG. 3A in an open configuration.

Referring to FIG. 3B, a perspective schematic is provided of a hasp 6 in which the detachable connector 10 comprises a connector loop 11 that circles the first leaf 20, such that when the first leaf 20 moves away from the second leaf 22 after mechanical failure of the pin 12, the connector loop 11 slides off of the first leaf 20 thereby detaching the connector 10 from the hasp 6 and allowing the fire resistant shutter 100 to fall to the deployed position due to the force of gravity.

The hasp optionally further includes an attachment protrusion for attaching the connector to the first leaf. The attachment protrusion may have a hook shape or other shape to which the detachable connector can be releasably affixed.

In an alternate embodiment, a hinge comprises a loop separate from and disposed at a distance from the second leaf as opposed to integral with the second leaf. The loop is attached to the second panel in a location such that it cooperates with an aperture defined by the first leaf. Such a configuration minimizes the amount of material needed to form the second leaf of a hasp.

Figure 4:
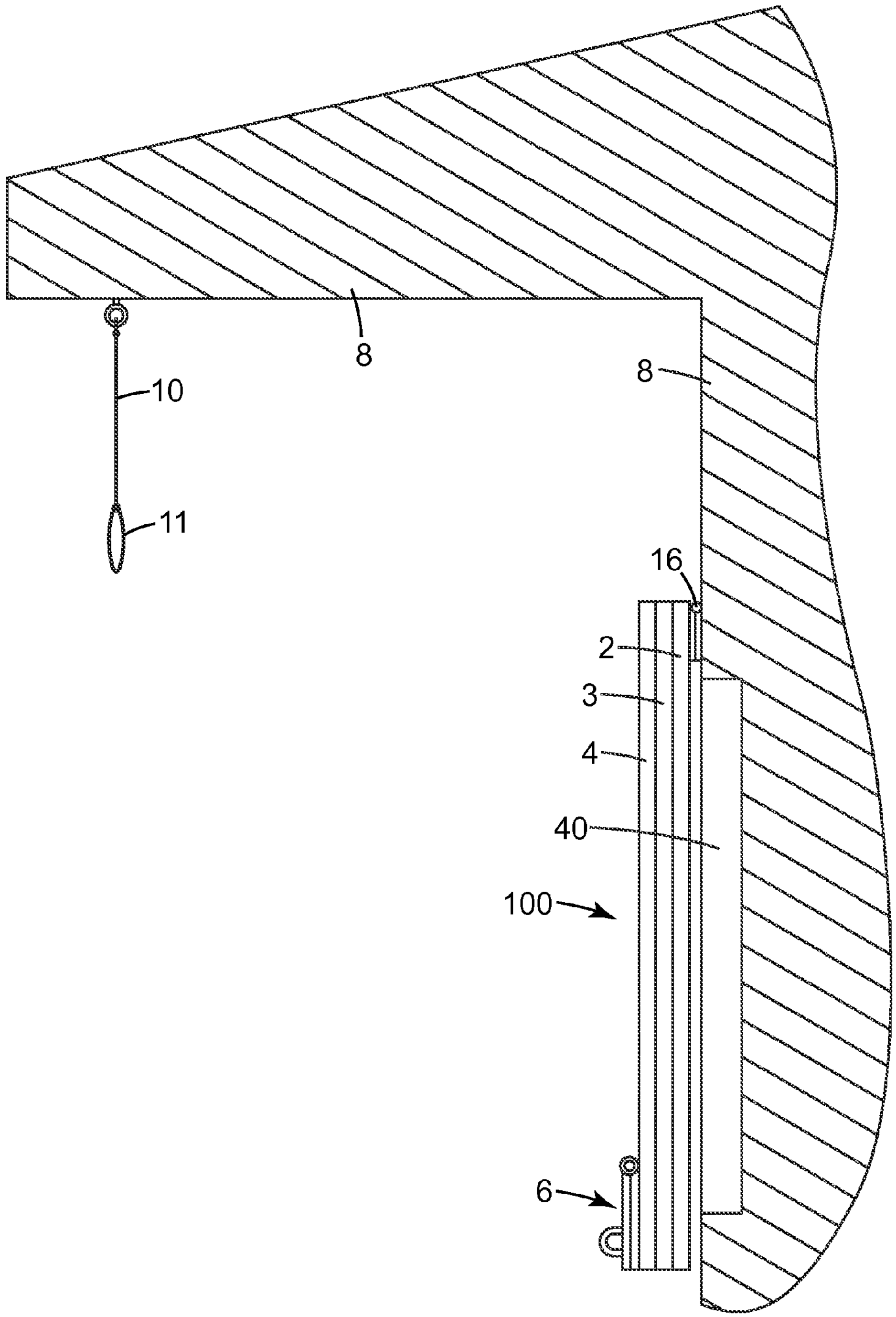
FIG. 4 is a cross-sectional schematic including the fire resistant shutter according to FIG. 1, in a deployed position.

Referring to FIG. 4, a cross-sectional schematic of a fire resistant shutter 100 is provided shown in the deployed position. The fire resistant shutter 100 comprises a first panel 2 and a second panel 4, the second panel 4 disposed adjacent to the first panel 2. The fire resistant shutter 100 further comprises a hasp 6 attached to the second panel 4. The fire resistant shutter 100 is affixed to a building structure 8 via a hinge 16 attached to the first panel 2. The connector 10 is no longer attached to second panel 4. The fire resistant shutter 100 protects a window 40 in the building structure 8 from exposure to heat and flame.

An advantage of embodiments according to the present disclosure is that the fire resistant shutter is easily returned from a deployed position to a set position. As long as the fire resistant shutter was not damaged during deployment, a user can simply lift the shutter, reattach the connector to the hasp, and place a new pin in the hasp loop to secure the fire resistant shutter to a set position for reuse.

The present disclosure provides simple fire resistant shutters, such as for use in protecting residential building structures. A resident could readily obtain the materials from commercial retailers (e.g., home improvement stores, hardware stores, etc.), and assemble the fire resistant shutters without requiring specialized tools or manufacturing expertise. Advantageously, automatic fire resistant shutters according to the present application eliminate the need to employ an active fire suppression system or other expensive specialized materials. The fire resistant shutters preferably resist direct contact with fire for at least eight minutes, such as for at least ten minutes, to protect a vulnerable section of a building structure (e.g., a glass window or door).

Various non-limiting exemplary embodiments according to the present disclosure are provided below.

EXEMPLARY EMBODIMENTS

Embodiment 1 is a fire resistant shutter including a first panel comprising wood; and a second panel comprising a cementitious material, the second panel disposed adjacent to the first panel. The fire resistant shutter further includes a hasp attached to the second panel and configured to be attached to a building structure with a detachable connector; and a pin comprising wax disposed in an aperture defined by the hasp. The pin prevents the hasp from opening.

Embodiment 2 is the fire resistant shutter of embodiment 1, wherein the pin comprises a candle.

Embodiment 3 is the fire resistant shutter of embodiment 1 or embodiment 2, further including at least one hinge attached to the first panel or to the second panel.

Embodiment 4 is the fire resistant shutter of any of embodiments 1 through 3, further including a third panel disposed between the first panel and the second panel. The third panel comprises SHEETROCK (e.g., drywall or wallboard).

Embodiment 5 is the fire resistant shutter of any of embodiments 1 through 3, wherein the first panel comprises plywood, chipboard, oriented strandboard, or a combination thereof.

Embodiment 6 is the fire resistant shutter of any of embodiments 1 through 5, wherein the first panel includes a plurality of pieces of plywood, chipboard, oriented strandboard, or a combination thereof.

Embodiment 7 is the fire resistant shutter of any of embodiments 1 through 6, wherein the first panel is attached to the second panel with an adhesive.

Embodiment 8 is the fire resistant shutter of any of embodiments 1 through 7, wherein the first panel is attached to the second panel with a mechanical fastener.

Embodiment 9 is the fire resistant shutter of embodiment 8, wherein the mechanical fastener includes a bolt, a screw, a nail, or a combination thereof.

Embodiment 10 is the fire resistant shutter of any of embodiments 1 through 9, wherein the detachable connector includes a wire, a rope, a chain, or a combination thereof.

Embodiment 11 is the fire resistant shutter of any of embodiments 1 through 10, wherein the first panel and the second panel have the same width and the same length.

Embodiment 12 is the fire resistant shutter of any of embodiments 1 through 10, wherein the first panel has a smaller width, a smaller length, or both, than the second panel.

Embodiment 13 is the fire resistant shutter of any of embodiments 1 through 12, wherein the cementitious material comprises cement board.

Embodiment 14 is the fire resistant shutter of any of embodiments 1 through 13, wherein the second panel has a thickness of about 0.5 inch (1.27 centimeters).

Embodiment 15 is the fire resistant shutter of any of embodiments 1 through 14, wherein the first panel has a thickness of about 0.5 inch (1.27 centimeters).

Embodiment 16 is a fire resistant shutter including a first panel comprising plywood; and a second panel comprising cement board, the second panel disposed adjacent to the first panel. The fire resistant shutter further includes a hasp attached to the second panel and configured to be attached to a building structure with a detachable wire; and a pin comprising wax disposed in an aperture defined by the hasp. The pin prevents the hasp from opening.

Embodiment 17 is the fire resistant shutter of embodiment 16, wherein the pin comprises a candle.

Embodiment 18 is the fire resistant shutter of embodiment 16 or embodiment 17, further including at least one hinge attached to the first panel or to the second panel.

Embodiment 19 is the fire resistant shutter of any of embodiments 16 through 18, further including a third panel disposed between the first panel and the second panel. The third panel comprises SHEETROCK (e.g., drywall or wallboard).

Embodiment 20 is the fire resistant shutter of any of embodiments 16 through 19, wherein the first panel includes a plurality of pieces of plywood.

Embodiment 21 is the fire resistant shutter of any of embodiments 16 through 20, wherein the first panel is attached to the second panel with an adhesive.

Embodiment 22 is the fire resistant shutter of any of embodiments 16 through 21, wherein the first panel is attached to the second panel with a mechanical fastener.

Embodiment 23 is the fire resistant shutter of embodiment 22, wherein the mechanical fastener includes a bolt, a screw, a nail, or a combination thereof.

Embodiment 24 is the fire resistant shutter of any of embodiments 16 through 23, wherein the first panel and the second panel have the same width and the same length.

Embodiment 25 is the fire resistant shutter, of any of embodiments 16 through 23, wherein the first panel has a smaller width, a smaller length, or both, than the second panel.

Embodiment 26 is the fire resistant shutter of any of embodiments 16 through 25, wherein the second panel has a thickness of about 0.5 inch (1.27 centimeters).

Embodiment 27 is the fire resistant shutter of any of embodiments 16 through 26, wherein the first panel has a thickness of about 0.5 inch (1.27 centimeters).

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

All materials used in the Examples below were obtained from a Home Depot retail store.

Fire Resistance Test Method

Each sample was placed on top of a circular propane burner approximately 13 inches across and 12 inches (30.5 centimeters) high. The propane burner was employed to subject each sample to fire in direct contact with each sample, for a time of up to ten minutes. A common birthday candle, a popping turkey thermometer, and an oven thermometer were each placed on top of each sample.

Comparative Example 1

Half Inch Thick Plywood

The sample of Comparative Example 1 was a 12 inch by 24 inch (30.5 cm×61 cm) sheet of 0.5 inch (1.27 cm) thick plywood. The plywood sheet was placed on the propane burner, and after 23 seconds of exposure to fire, the plywood sheet started burning. After 45 seconds of exposure to fire, the test was stopped due to the plywood sheet being on fire.

Comparative Example 2

Quarter Inch Cement Board with Half Inch Plywood

The sample of Comparative Example 2 was a 12 inch by 24 inch (30.5 cm×61 cm) sheet of 0.5 inch (1.27 cm) thick plywood disposed on top of a 12 inch by 24 inch (30.5 cm×61 cm) sheet of 0.25 inch (0.64 cm) thick cement board. The cement board sheet was placed on the propane burner. After 3 minutes of exposure to fire, the birthday candle bent, indicating heat transfer through the thickness of the cement board and plywood. After 4 minutes of exposure to fire, the surface of the cement board sheet visibly darkened. After 7 minutes and 18 seconds of exposure to fire, the plywood sheet started burning. After 7 minutes and 50 seconds of exposure to fire, the test was stopped due to the plywood sheet being on fire.

Comparative Example 3

Twenty-Eight Gauge Steel with Half Inch Plywood

The sample of Comparative Example 3 was a 12 inch by 24 inch (30.5 cm×61 cm) sheet of 0.5 inch (1.27 cm) thick plywood disposed on top of a 12 inch by 24 inch (30.5 cm×61 cm) sheet of 28 gauge (0.396 millimeters) steel. The steel sheet was placed on the propane burner. After 1 minute of exposure to fire, the plywood sheet started burning. After 2 minutes of exposure to fire, the test was stopped due to the plywood sheet being on fire.

Example 1

Half Inch Cement Board with Half Inch Plywood

The sample of Example 1 was a 12 inch by 24 inch (30.5 cm×61 cm) sheet of 0.5 inch (1.27 cm) thick plywood disposed on top of a 12 inch by 24 inch (30.5 cm×61 cm) sheet of 0.5 inch (1.27 cm) thick cement board. The cement board sheet was placed on the propane burner. After 2 minutes of exposure to fire, no changes were observed. After 2 minutes and 45 seconds, of exposure to fire, the edges of the cement board sheet visibly blackened. After 6 minutes of exposure to fire, no further changes were observed. After 10 minutes of exposure to fire, the test was completed without an increase in the temperature measured by the oven thermometer placed on top of the plywood sheet.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A fire resistant shutter comprising: a first panel comprising wood; a second panel comprising a cementitious material, the second panel disposed adjacent to the first panel; a hasp attached to the second panel and configured to be attached to a building structure with a detachable connector; and a pin consisting essentially of wax material disposed in an aperture defined by the hasp, the pin preventing the hasp from opening.

2. The fire resistant shutter of claim 1, wherein the pin is a candle.

3. The fire resistant shutter of claim 1, further comprising at least one hinge attached to the first panel or to the second panel.

4. The fire resistant shutter of claim 1, further comprising a third panel disposed between the first panel and the second panel, the third panel comprising drywall or wallboard.

5. The fire resistant shutter of claim 1, wherein the first panel is attached to the second panel with an adhesive.

6. The fire resistant shutter of claim 1, wherein the detachable connector comprises a wire, a rope, a chain, or a combination thereof.

7. The fire resistant shutter of claim 1, wherein the first panel and the second panel comprise the same width and the same length.

8. The fire resistant shutter of claim 1, wherein the first panel comprises a smaller width, a smaller length, or both, than the second panel.

9. The fire resistant shutter of claim 1, wherein the first panel comprises a thickness of about 0.5 inch (1.27 centimeters).

10. The fire resistant shutter of claim 1, wherein the first panel comprises plywood, chipboard, oriented strandboard, or a combination thereof.

11. The fire resistant shutter of claim 10, wherein the first panel comprises a plurality of pieces of plywood, chipboard, oriented strandboard, or a combination thereof.

12. The fire resistant shutter of claim 1, wherein the first panel is attached to the second panel with a mechanical fastener.

13. The fire resistant shutter of claim 12, wherein the mechanical fastener comprises a bolt, a screw, a nail, or a combination thereof.

14. The fire resistant shutter of claim 1, wherein the second panel comprises cement board.

15. The fire resistant shutter of claim 14, wherein the second panel comprises a thickness of about 0.5 inch (1.27 centimeters).

16. A fire resistant shutter comprising: a first panel comprising plywood; a second panel comprising cement board, the second panel disposed adjacent to the first panel; a hasp attached to the second panel and configured to be attached to a building structure with a detachable wire; and a pin consisting essentially of wax material disposed in an aperture defined by the hasp, the pin preventing the hasp from opening.

17. The fire resistant shutter of claim 16, wherein the pin is a candle.

18. The fire resistant shutter of claim 16, further comprising at least one hinge attached to the first panel or to the second panel.

19. The fire resistant shutter of claim 16, further comprising a third panel disposed between the first panel and the second panel, the third panel comprising drywall or wallboard.

20. The fire resistant shutter of claim 16, wherein the first panel comprises a thickness of about 0.5 inch (1.27 centimeters).

* * * * *